C. A. WEST.
DRAFT EVENER.
APPLICATION FILED JUNE 25, 1920.
1,397,474.
Patented Nov. 15, 1921.
2 SHEETS—SHEET 2.
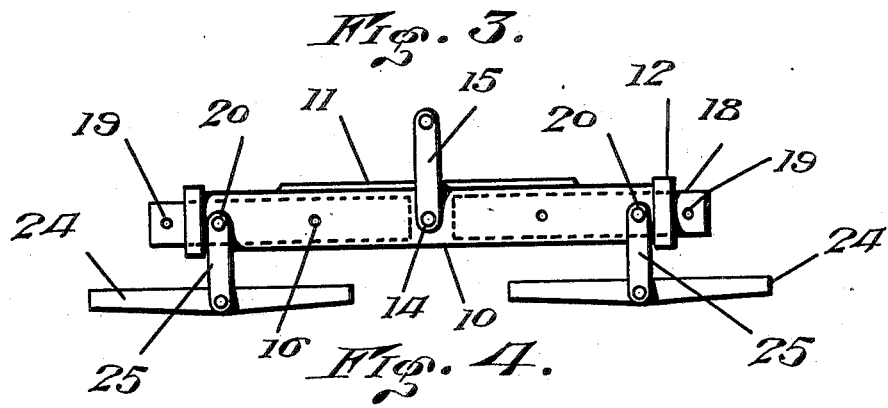
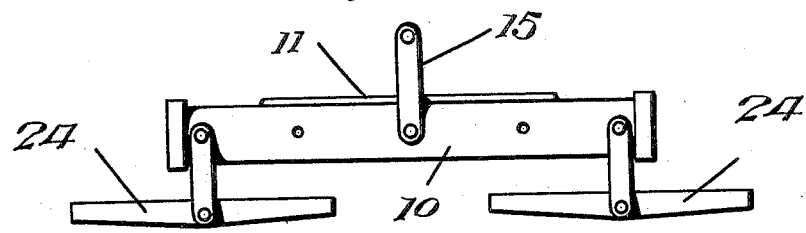
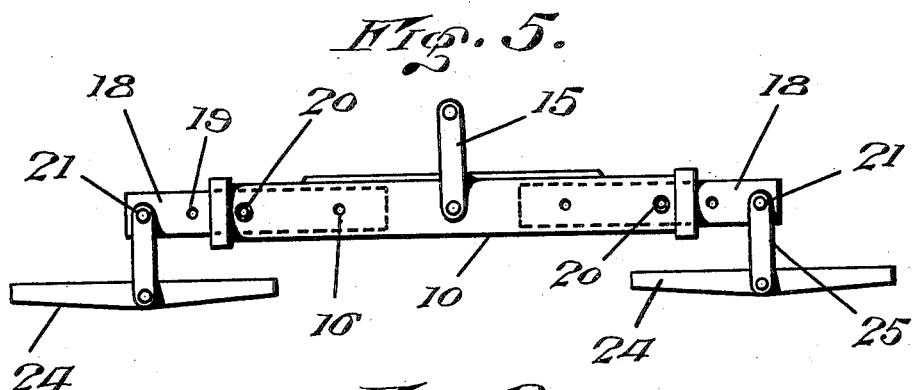
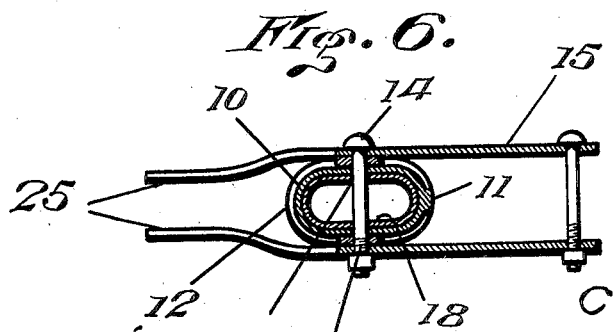

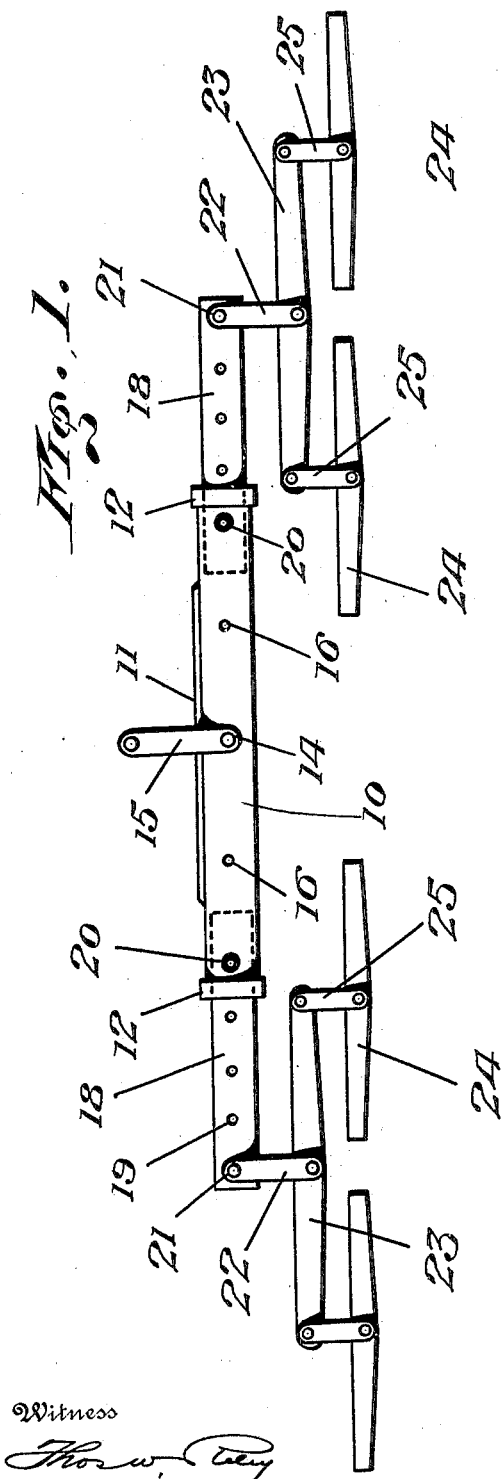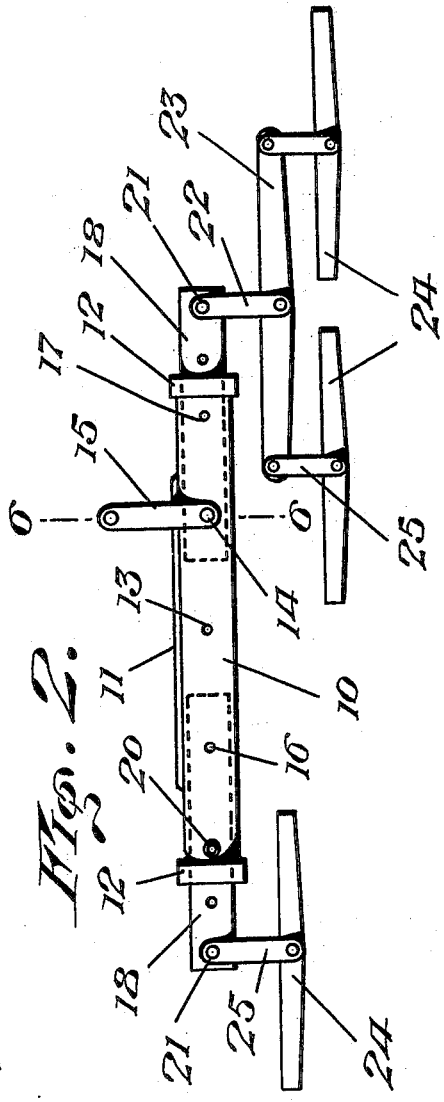

UNITED STATES PATENT OFFICE.

CHALMERS A. WEST, OF MANGUM, OKLAHOMA.

DRAFT-EVENER.

1,397,474.   Specification of Letters Patent.   Patented Nov. 15, 1921.

Application filed June 25, 1920. Serial No. 391,667.

*To all whom it may concern:*

Be it known that I, CHALMERS A. WEST, a citizen of the United States, residing at Mangum, in the county of Greer and State of Oklahoma, have invented certain new and useful Improvement in Draft-Eveners; and I do hereby declare the following to be a full, clear, and exact description of the invention, such as will enable others skilled in the art to which it appertains to make and use the same.

The present invention relates to draft eveners or whiffle trees, and aims to provide a device of that character of novel and improved construction capable of adjustment for the hitching of two, three, four or more horses or animals, with a long or a short hitch.

A further object is the provision of such a draft evener comprising a whiffle tree having adjustable extensions, and means for retaining said extensions in various adjustments, and for the connection of double and swingle trees, at various distances apart, and to accommodate two, three or four animals.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a plan view of the evener as adjusted for four horses.

Fig. 2 is a plan view showing the device adjusted for three horses.

Fig. 3 is a plan view showing the device as adjusted for two horses with a short hitch and the extensions used for strength.

Fig. 4 is a view similar to Fig. 3, showing the extensions removed to lighten the weight.

Fig. 5 is a plan view showing the device adjusted for two horses with a long hitch.

Fig. 6 is an enlarged cross section taken on the line 6—6 of Fig. 2.

The device comprises a whiffle tree or evener bar 10 of flattened tubular form, preferably made from metal piping, and of elliptical cross section with the top and bottom thereof flat, so as to have great strength in a horizontal plane.

A reinforcing bar 11 is welded, soldered or otherwise secured to the bar or member 10 along the rear edge thereof, to stiffen and strengthen the same, and bands 12 are secured on the ends of said bar. The bar 10 has a vertical aperture 13 midway between the ends thereof, for the reception of a bolt 14 for the connection of the clevis or links 15 used for coupling the bar to the wagon, harvester, or other object to be drawn. The bar 10 also has apertures 16 between the aperture 13 and ends of the bar, and similar apertures 17 adjacent to the ends and bands 12 of the bar.

An extension 18 is telescoped in each end of the bar 10, being of similar cross section, but of smaller outline, so as to fit slidably within the bar, and the extensions 18 have longitudinal series of apertures 19 arranged to simultaneously register with the apertures 16 and 17, in various adjustments of the extensions.

In using the evener for four horses, as seen in Fig. 1, the extensions 18 are extended from the ends of the bar 10 to the desired distances, and bolts 20 are then inserted through the apertures 17 and the registering apertures 19 of the extensions 18. Bolts 21 are then extended through the endmost apertures 19 of the extensions for the connections of the clevises or the links 22 of the double trees 23, to which the swingle trees 24 are connected by the links or connections 25. The draft is thus distributed evenly between the two sets of swingle trees.

In using the device for three horses, as seen in Fig. 2, the extensions 18 are only partially extended, and the bolt 14 is inserted through one of the apertures 16 and a registering aperture of one extension 18, thereby shifting the clevis or links 15 nearer one end of the bar 10 than the other, or about one third the distance between the corresponding extension 18 to the other one, between the opposite ends thereof. The other extension 18 is secured by the bolt 20, and has a swingle tree 24 connected thereto by means of the bolt 21, while the extension 18 of the short arm of the evener has a double tree 23 connected thereto in the same manner as shown in Fig. 1. Thus, the evener is shortened, and has a short arm and a long arm about double the length of the short arm, with the double tree connected to the short arm and the swingle tree connected to the long arm for distributing the draft uniformly to the three swingle trees.

Fig. 3 shows a pair of swingle trees 24 having their links or clevises 25 connected to the bolts 20 inserted through the apertures 17 of the bar 10 and through the extensions 18, for the connection of two horses with a short hitch, that is, with the horses close together. The extensions 18 thus provide considerable strength, whereas, as shown in Fig. 4, with the extensions 18 removed, the evener is considerably lighter for a lighter draft.

Fig. 5 shows the extensions 18 partially extended, and held by the bolts 20 with a pair of swingle trees connected to the bolts 21 of the extensions for the connection of two horses with a long hitch, or with the horses spaced apart farther than shown in Figs. 3 and 4.

The extensions 18 thus provide for the spacing of the horses at the opposite sides with long and short hitches, as well as providing for adjustments for two, three or four horses. The evener can be used under five different conditions, as shown in Figs. 1 to 5, inclusive, thereby giving it a wide range of use and providing for economy as well as convenience, and can also be used for five or six horses by adjusting the extensions accordingly.

Having thus described the invention, what is claimed as new is:—

1. A draft evener of the character described, comprising a tubular evener bar having an aperture midway between its ends, apertures between said aperture and ends of the bar and other apertures adjacent to the ends of said bar, an extension slidable in each end of said bar and having a longitudinal series of apertures to register simultaneously with the corresponding second and third named apertures of the bar, means engageable in the apertures of the extensions and the second and third named apertures of the bar for the connection of double and swingle trees and for securing the extensions to the bar, and coupling means engageable through the first and second named apertures and corresponding apertures of said extensions.

2. A draft evener of the character described, comprising a flattened tubular evener bar, extensions slidable in the ends thereof, a reinforcing bar secured to the evener bar along the rear edge thereof, bands secured on the ends of said evener, means engageable with said bar in front of the reinforcing bar for the connection of the evener bar to an object to be drawn, and means engageable through said evener bar and extensions adjacent to said bands for the connection of swingle trees or to secure the extensions to the evener bar.

In testimony whereof I have signed my name to this specification in the presence of two subscribing witnesses.

CHALMERS A. WEST.

Witnesses:
O. P. ELLIOTT,
J. K. BUSBY.